United States Patent [19]

Allen et al.

[11] 4,342,850

[45] Aug. 3, 1982

[54] PROCESS FOR THE PREPARATION OF HYDROCARBON RESINS

[75] Inventors: Robert P. Allen; Albert C. Ruggles, both of Longview, Tex.

[73] Assignee: Eastman Kodak Company, Rochester, N.Y.

[21] Appl. No.: 200,866

[22] Filed: Oct. 27, 1980

[51] Int. Cl.$^3$ .................................................. C08F 8/04
[52] U.S. Cl. .................................. 525/339; 524/291; 525/338; 526/76; 526/290
[58] Field of Search .................. 526/290; 525/339, 338

[56] References Cited

U.S. PATENT DOCUMENTS

| | | | |
|---|---|---|---|
| 2,753,326 | 7/1956 | Hamner | 526/290 |
| 3,600,463 | 8/1971 | Hagemeyer, Jr. et al. | 525/405 |
| 3,709,854 | 1/1973 | Hepworth et al. | 526/290 |
| 3,817,953 | 6/1974 | Younger | 526/290 |
| 4,118,555 | 10/1978 | Vargiu et al. | 526/290 |
| 4,276,396 | 6/1981 | Gwynn | 525/339 |

*Primary Examiner*—Stanford M. Levin
*Attorney, Agent, or Firm*—Clyde L. Tootle; Daniel B. Reece III

[57] ABSTRACT

This invention relates to improved processes for hydrocarbon resin preparation. More particularly, the invention relates to treating the $C_5$ and higher mixed thermally soaked hydrocarbon fraction mixture obtained in the steam cracking of propane and ethane with alumina prior to polymerizing the hydrocarbon fraction mixture with a Friedel-Crafts catalyst to form a high softening point hydrocarbon resin. The polymerized resin is then quenched or diluted, washed to remove catalyst residues, dried and hydrogenated to provide high softening point hydrocarbon resins.

1 Claim, No Drawings

PROCESS FOR THE PREPARATION OF HYDROCARBON RESINS

This invention relates to improved processes for hydrocarbon resin preparation. More particularly, the invention relates to treating the $C_5$ and higher mixed thermally soaked hydrocarbon fraction mixture obtained in the steam cracking of propane and ethane with alumina prior to polymerizing the hydrocarbon fraction mixture with a Friedel-Crafts catalyst to form a high softening point hydrocarbon resin. The polymerized resin is then quenched or diluted, washed to remove catalyst residues, dried and hydrogenated to provide high softening point hydrocarbon resins.

It is well known in the art to prepare hydrocarbon resins by the aluminum chloride catalyzed polymerization of streams such as the $C_5+$ by-product streams from hydrocarbon cracking processes. In most of these prior processes the $C_5+$ stream is reacted directly with the catalyst. However, these processes do not always yield resins that are compatible in forming blends with a polyethylene. This incompatibility is attributed to the presence of cyclopentadiene monomer in the $C_5+$ stream which yields a gel-like, incompatible polymer when polymerized with aluminum chloride. For this reason, previously in some instances a thermal treatment or soaking of the $C_5+$ stream is carried out prior to polymerization which brings about the dimerization of the cyclopentadiene to its dimer, dicyclopentadiene. Such heat treating processes are disclosed in, for example, U.S. Pat. Nos. 3,817,953 and 3,709,854, which illustrate the use of the thermal treatment prior to the polymerization step. However, these heat-treating processes have not always proven satisfactory since the presence of approximately 10 percent dicyclopentadiene will provide a high degree of crosslinked polymer which will generally be incompatible with polyolefins, such as polyethylene. Recently it has been discovered that the heat treated stream can be fractionally distilled to remove the unreacted $C_5$'s and the benzene/toluene mixture to provide a resin feedstock which can be polymerized to provide a high softening point hydrocarbon resin which is compatible with polyolefins such as polyethylene and which can be prepared from the $C_5$ and higher feed stream obtained from the steam cracking of propane and ethane. However, this resin feedstock exhibits variable activity due to presence of minor constituents and cannot be routinely polymerized to form satisfactory yields of hydrocarbon resin. Therefore, it would be an advance in the state of the art to provide a process for improving the hydrocarbon yields of the thermal treated-fractionated resin feedstock prepared from the $C_5$ and higher feed stream obtained from the steam cracking of propane and ethane.

In accordance with the present invention an alumina treated thermally treated-fractionated hydrocarbon feedstock composed of $C_5$ and higher stream is provided which can be polymerized with a Friedel-Crafts catalyst to provide a high softening point hydrocarbon resin in improved yields.

The preparation of hydrocarbon resin feedstocks from cracked gas by-product streams is well known in the art. The propane and ethane feedstock is cracked to provide ethylene and propylene. The feedstock after cracking is subjected to fractionation to remove hydrogen, methane and $C_2$ to $C_4$ light ends. After fractionation, the residue of $C_5$ and higher feedstock is thereafter subjected to a thermal soaking process. After the thermal soaking process, the stream is fractionated to remove the unreacted olefins or dienes and aromatics up through toluene, from the heat treated product to provide a concentrated base material. This concentrated base material is then treated with activated alumina prior to polymerization with a Friedel-Crafts catalyst.

The resin feedstock used in this invention is, therefore, unique in that after heat-treatment, the mixture is fractionated to remove any unreacted dienes such as isoprene, piperylenes, cyclopentadiene and methylcyclopentadienes and any unreacted olefins and subsequently treated with activated alumina. Furthermore, the distillation process using a base temperature of 170°–200° C. also serves to decrease the amount of dicyclopentadiene in the resin feedstock. The resins prepared from feedstock which has been heat-treated and subsequently fractionated using a base temperature of 170°–200° C. and treated with activated alumina have been found to have high softening points and to be compatible with low molecular weight polyethylene wax.

The resin feedstock is prepared as follows:

(1) The $C_5+$ by-product stream, boiling point 20°–200° C., and composed principally of pentenes, isoprene, cyclopentene, cyclopentadiene and dimer, methylcyclopentadiene and dimers, methylcyclopentenes, benzene and toluene is heat-treated by continuously passing the stream through a stirred autoclave maintained at 175°–250° C., preferably at 225°, and under a pressure of 450–500 psig. The through-put time can be varied from about 0.5 to 16 hours, preferably about 2 to 4 hours.

(2) The heat-treated mixture is then fractionally distilled to remove the unreacted $C_5$'s and the benzene-toluene mixture. The fractionation of the heat-treated stream can be carried out using one or more fractionation columns so long as a base temperature of 170°–200° C. is employed to ensure that substantially all of the dicyclopentadienes are recovered. In the present invention it is desirable to employ two columns so that the unreacted $C_5$'s and the benzene-toluene mixtures are recovered as separate fractions since these fractions can be further used for different purposes. However, these two fractions can be recovered together as one mixture and the residual base product is the resin feedstock used in the process of this invention.

In the analysis of the resin feedstock by gas chromatography it is found that about 40–50 percent of the above fractions are not eluted from a 50 foot Squalane SCOT fractionation column when a maximum temperature of 130° is employed. The major components of the feedstock are the $C_{10}$ adducts with tetrahydromethanoindan being present in about 20–30 percent. Dicyclopentadiene is present at about 0.5–8.0 percent depending on whether the base temperature used is 170° C. or 200° C. in the fractionations. Overall the resin feedstock is a very complex mixture comprised of several hundred components.

(3) The fractionated-heat treated resin feedstock is then treated with activated alumina. Various sizes of alumina may be employed in the process, however, since the efficiency of adsorption increases as the surface area of the adsorbent employed is increased, a smaller particle size may be preferred depending on the type of contact used. Suitable sizes of alumina include from about 4 to about 14 mesh alumina.

The alumina is activated by heating to a temperature generally above 100° C. in a vacuum oven. Generally, heating at a temperature of 120° C. for a period of 1–4 hours is sufficient. The activated alumina can be added to the fractionated-heat treated resin feedstock and the feedstock treated by stirring at ambient temperature for a period of one hour or heated if desired. Also, this treatment can be carried out in a closed system. The activated alumina can be used in an amount of 20 percent, by weight, of the resin to be treated. Greater amounts can be used however no improvement is noted and less than 20 percent may not provide complete activation of the resin feedstock.

The alumina treated resin feedstock can then be polymerized in a conventional manner with conventional Friedel-Crafts catalyst. Moreover, any conventional Friedel-Crafts catalyst can be used. The polymerizations can be run either batch wise or continuous.

In batch runs the catalyst, either ethyl aluminum dichloride or boron trifluoride etherate is added to the stirred resin feedstock at ambient temperature and under an inert atmosphere. The usual catalyst concentrations were in the range 0.4–2.0 weight percent. When boron trifluoride etherate is used the amount of catalyst employed is figured as boron trifluoride. The resin feedstock is slowly heated to the polymerization temperature of about 60° to 150° C. and maintained at that temperature the prescribed length of time. The preferred conditions using aluminum chloride as the catalyst were 1.5 percent catalyst for a reaction temperature of 140° for a period of about 2 to 4 hours. The preferred conditions with boron trifluoride are 0.6 percent catalyst at a temperature of 160° for a period of 2 to 4 hours.

In the continuous runs a catalyst slurry or solution and the resin feedstock were added to a stirred reactor maintained at the polymerization temperature. The overflow from the first reactor passed into a second reactor. With aluminum chloride catalyst the preferred concentration was 1.0 percent by weight with the temperature of the first reactor at 70° C. and the second reactor at 140° C. The most suitable addition rate gave an approximate residence time of 12 hours in both reactors.

The crude resin reaction mixture was then quenched or diluted with a hydrocarbon solvent such as mineral spirits, extracted with an aqueous caustic solution to destroy the catalyst, dried by azeotropic distillation and hydrogenated under conventional conditions to produce a low color, high softening point resin.

The hydrogenation can be carried out using a nickel-supported catalyst, such as Harshaw Ni-3210T, at a temperature of 300°–320° C. and 3000 psig hydrogen for a period of 1–2 hours for a batch operation. From the continuous polymerization unit the crude resin solution was passed continuously through two catalyst beds; the first contained 0.5 percent palladium on alumina catalyst maintained at a temperature of about 260° and 250–500 psig hydrogen, and the second reactor used a supported nickel catalyst, such as Harshaw's Ni-3210T, at a temperature of about 290°–330° C. and 2900 psig hydrogen. The hydrogenation time was generally 1–2 hours in each reactor to provide a low color resin having a Gardner color of about 5 or less.

The hydrogenated resin solution is then filtered to remove catalyst fines and concentrated by means of vacuum stripping or gas stripping to produce a low color resin with the desired high softening point of about 90° C. to about 200° C., preferably about 100° C. to about 160° C.

The compatibility of the hydrogenated product with low molecular weight polyethylene wax is measured as the light transmittance of a 30 percent blend with low molecular weight polyethylene wax measured at 525 nm and 150° C. The lower limit for a compatible resin is a 75 percent light transmittance.

This invention can be further illustrated by the following examples, although it will be understood that these examples are included merely for purposes of illustration and are not intended to limit the scope of the invention unless otherwise specifically indicated.

EXAMPLE 1

This example illustrates the preparation of a resin feedstock useful in preparing a low color hydrocarbon resin.

100 Grams of a $C_5+$ by-product stream produced in the cracking process of an ethane-propane mixture and composed principally of pentenes, isoprene, cyclopentene, piperylenes, cyclopentadiene, methylcyclopentene, methylcyclopentadienes, benzene and toluene was stabilized with 20 ppm 2,6di-tert-butyl-p-cresol (BHT) and passed through a stirred autoclave heated at 225° C., with a residence time of 4.85 hours. The pressure in the autoclave was operated at 450±10 psig. The heat-treated stream was fractionated to first remove the unreacted $C_5$'s with an overhead temperature range of 60°–65° and then to remove the benzene-toluene mixture at 80°–85° C. The base temperature was maintained at 170° C. Chromatographic analysis of the remaining base product, hereafter referred to as the resin feedstock, showed a variety of $C_{10}$ adducts including about 8 percent dicyclopentadiene. The prominent $C_{10}$ product was tetrahydromethanoindan in about 26 percent. The resin feedstock contained lesser amounts of $C_{11}$–$C_{15}$ adducts in addition to a significant amount of thermal polymer ($>C_{20}$) that did not elute from the column. Conversion of this $C_5+$ by-product stream to the resin feedstock was 19.7 grams.

EXAMPLE 2

To 200 grams of resin feedstock of Example 1 in 50 ml mineral spirits was added 0.8 percent by weight of aluminum chloride under an inert atmosphere at ambient temperature. The mixture was slowly heated until at about 115° C. a slight exothermic reaction set in which took the temperature to 140° C. The temperature was maintained at 140° with external heating for 4 hours. The reaction mixture was diluted with 300 mls mineral spirits and washed twice while hot with about 20 ml of a 10 percent caustic solution. The organic phase was then dried by azeotropic distillation and filtered. The filtrate was subjected to vacuum stripping to 320° C. base temperature at 50 torr. The crude resin was obtained in 81% yield, by weight and had a softening point of 153° C. and a Gardner color of 16.

EXAMPLE 3

To 200 grams of the resin feedstock of Example 1 was added 20 grams of activated alumina (Alcoa F-20 alumina) and the resin feedstock stirred for one hour at ambient temperature. The material was then filtered to provide an activated resin feedstock.

EXAMPLE 4

To 200 grams of the activated resin feedstock of Example 3 was added 0.8 percent by weight aluminum trichloride under an inert atmosphere at ambient temperature. The reaction showed a slight exotherm and the temperature rose to 55° before external heat was applied. The temperature was maintained at 140° C. for 4 hours, cooled and diluted with 50 ml mineral spirits. The catalyst was removed by a washing with 20 ml of a 10% caustic wash and the resin product was worked up as described in the previous examples. The resin was obtained in 91 percent yield, having a Gardner color of 15, a softening point of 192° C.

EXAMPLE 5

This example illustrates the preparation of a blend of the present invention and low density polyethylene wax and its evaluation in a hot melt adhesive formulation.

A mixture by weight of 70 percent polyethylene wax, 29.55 percent hydrocarbon resin, 0.1 percent tetrakis[methylene-3',5-di-t-butyl-4-hydroxyphenyl)propionate]methane (Irganox 1010), and 0.35 percent lauryl stearyl thiodipropionate (Cyanox 1212) was heated in a nitrogen atmosphere to 177° C. until molten. The melt was then mechanically stirred for 30 minutes until homogeneous and tested as a hot melt adhesive. The results are summarized below.

Color-1 (Gardner)
Softening Pt., °C.-100
73° F. Peel Strength, gm-776
Shear Failure Temperature, °F.-193
Peel Failure Temperature, °F.-Ω

Viscosity (350° F.), cp-2,225

The hydrocarbon tackifying resins prepared according to the present invention are useful in blends with low molecular weight polyethylene wax to produce hot melt adhesives. These hydrocarbon resins can be used as substitutes for terpene or rosin-based resins or for any of the hydrogenated, aliphatic resins that are commercially available. Other uses for these resins include rubber compounding, highway markings, inks, textile sizing or in many other applications where terpene, rosin or hydrocarbon resins are normally used.

The invention has been described in detail with particular reference to preferred embodiments thereof, but it will be understood that variations and modifications can be made within the spirit and scope of the invention.

I claim:

1. A process for preparing a high softening point hydrocarbon resin which comprises heat treating the $C_5$ and higher hydrocarbon fraction mixture obtained in the steam cracking of propane and ethane by continuously passing said mixture through a stirred autoclave maintained at 175° to 250° C. under a pressure of 450–500 psig. for a period of 0.5 to 16 hours, fractionating said heat treated hydrocarbon fraction to remove the olefins and aromatics up through toluene, activating said fractionated heat treated fraction with alumina, polymerizing said activated fractionated heat treated fraction with a Friedel-Crafts catalyst, diluting said polymerized hydrocarbon fraction, washing said diluted polymerized hydrocarbon fraction with aqueous caustic, drying said washed fraction, and hydrogenating said dried fraction to provide a low color hydrocarbon resin.

* * * * *